March 2, 1954  G. B. TRIPP  2,670,817
EMERGENCY BRAKING SYSTEM
Filed Dec. 3, 1951  3 Sheets-Sheet 1
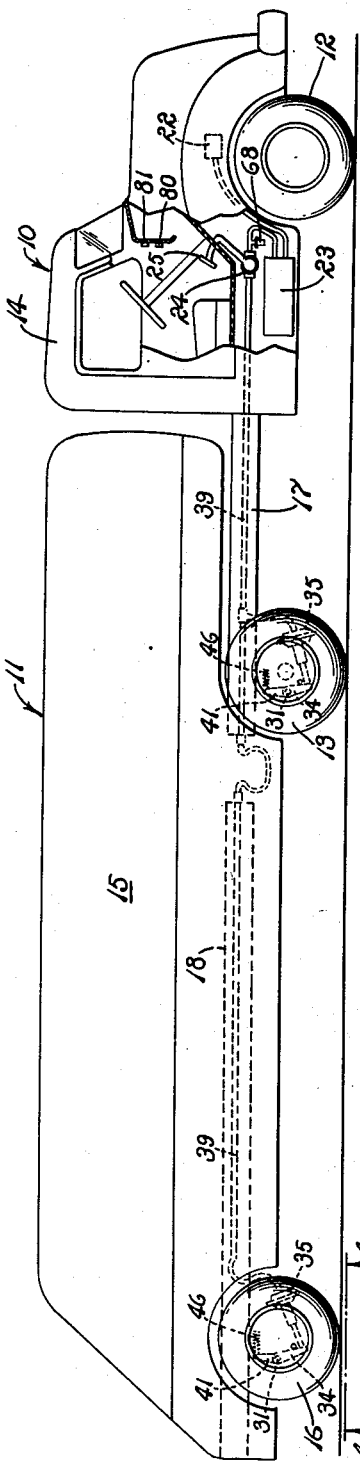
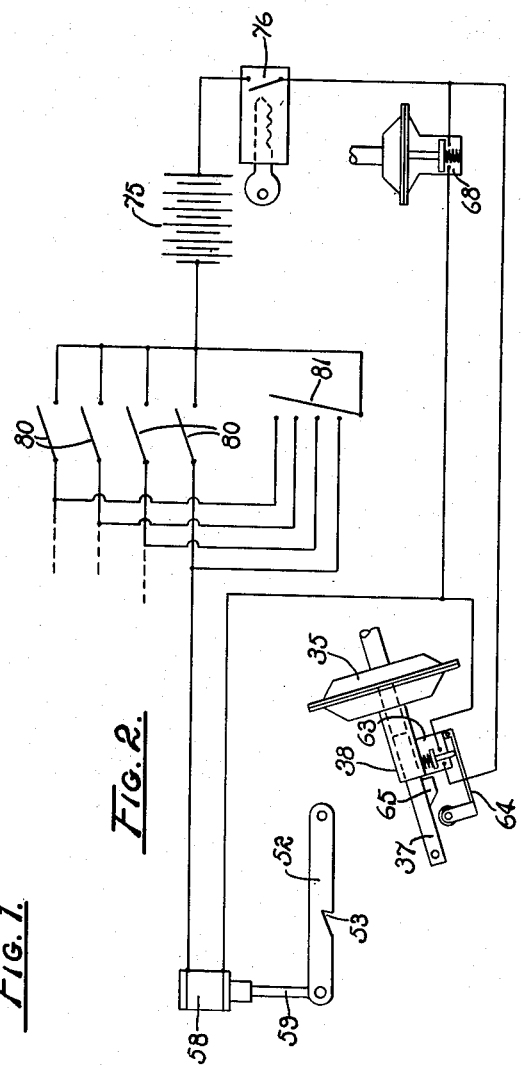
GORDON B. TRIPP
INVENTOR
HUEBNER, BEEHLER,
WORREL & HERZIG
ATTORNEYS March 2, 1954

G. B. TRIPP 2,670,817

EMERGENCY BRAKING SYSTEM

Filed Dec. 3, 1951

GORDON B. TRIPP
INVENTOR

HUEBNER, BEEHLER,
WORREL & HERZIG
ATTORNEYS

BY Richard M. Worrel

March 2, 1954 G. B. TRIPP 2,670,817
EMERGENCY BRAKING SYSTEM
Filed Dec. 3, 1951 3 Sheets-Sheet 3
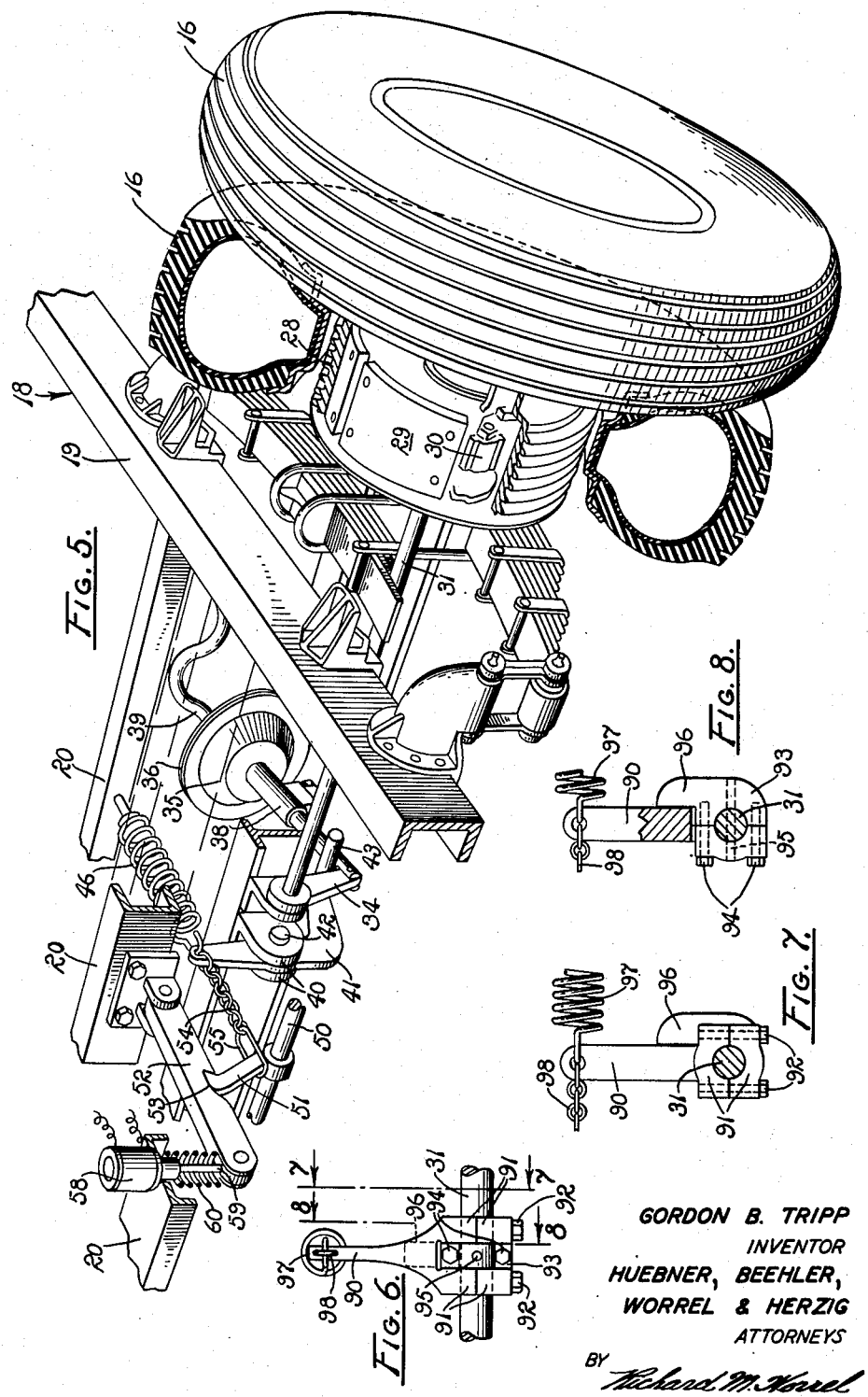
GORDON B. TRIPP
INVENTOR
HUEBNER, BEEHLER,
WORREL & HERZIG
ATTORNEYS
BY Patented Mar. 2, 1954

2,670,817

UNITED STATES PATENT OFFICE 2,670,817

EMERGENCY BRAKING SYSTEM

Gordon B. Tripp, Fresno, Calif.

Application December 3, 1951, Serial No. 259,652

8 Claims. (Cl. 188—156)

The present invention relates to brakes for wheel supported vehicles and more particularly to an emergency brake system for automotive vehicles having service brake systems, which emergency system is rendered operable by failure of the service associated therewith.

The ability promptly to decrease speed and/or to stop motor vehicles under all conditions is implicit to optimum highway safety. The momentum attained by modern high speed automotive traffic has made satisfactory braking difficult to attain and has led to the development of many brake operating systems including those mechanically, hydraulically, and pneumatically actuated.

In spite of the extensive development work devoted to the improvement of braking systems, brake failure continues to be the greatest single cause of accidents involving automotive freight carriers. For example, the "Analysis of Mechanical Defect Accidents of Motor Carriers" prepared by the Interstate Commerce Commission shows that for the year 1949, the most recent year conveniently available, brake failures constituted the cause of nearly 40% of all motor carrier accidents and in excess of four times the number of accidents caused by the next highest accident source.

Most modern brake systems for motor carriers are pneumatic or vacuum operated. Tables eight and eleven of the above identified bulletin of the Interstate Commerce Commission indicates that of the brake failures resulting in accidents, almost every failure was due to malfunction of the pneumatic or vacuum actuation portions of the systems involved. That is, loss of air, insufficient air, and failure to obtain the air in proper timed sequence in pneumatic and vacuum brake systems resulted in approximately 40% of all of the accidents in which motor carriers were involved during the year 1949.

The broad essence of the present invention resides in the discovery of an emergency braking system which when associated with a service system is automatically rendered operable by failure of the service system.

An object of the present invention is to minimize accidents involving automotive vehicles incident to brake failure.

Another object is to provide an improved emergency brake system automatically rendered operable by failure of a service system with which it is associated.

Another object is to provide an emergency system for use in connection with fluid operated braking systems rendered operable by failure of adequate fluid pressure supply. In this connection it is to be observed that the term "fluid" is intended to encompass both gases and liquids, as are well known in automotive brake systems.

Another object is to provide an emergency brake system rendered operable by such failure as that incident to excessive expansion of brake drums, incident to frictional heating, beyond the limits of control of conventional service systems.

Other objects and advantages are to provide improved elements and arrangements thereof in a system of the character and for the purposes set forth that is economical to produce, simple to install, of universal application, and fully effective in performing its intended operations.

Further objects and advantages will become apparent in the subsequent description in the specification.

Referring to the drawings:

Fig. 1 is a side elevation of a motor carrier of well known form illustrating a conventional service system therein and an emergency system embodying the principles of the present invention associated therewith.

Fig. 2 is a schematic diagram of the emergency system of the present invention.

Fig. 5 is a somewhat enlarged fragmentary perspective of a rear axle and pair of support wheels of the motor carrier showing associated mounting and braking structure.

Fig. 6 is a fragmentary elevation of a modified coupling structure utilized in the present invention.

Fig. 7 is a section taken on line 7—7 of Fig. 6.

Fig. 8 is a section taken on line 8—8 of Fig. 6.

Figure 3:
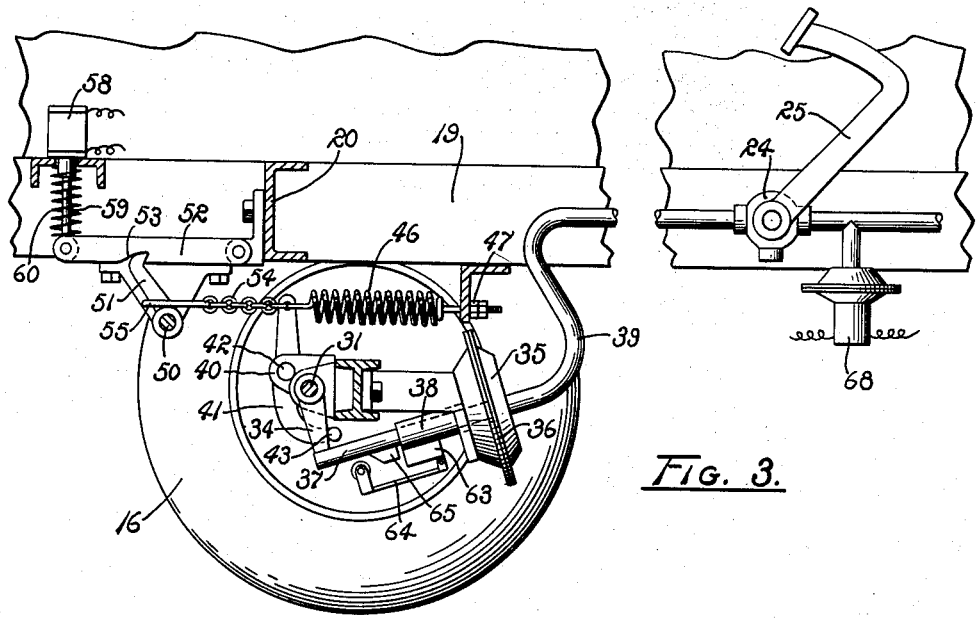
Fig. 3 is an enlarged, fragmentary, foreshortened, longitudinal section of the motor carrier of Fig. 1 illustrating the emergency system of the present invention.

Referring in greater detail to the drawings:

A motor carrier is illustrated in Fig. 1 consisting of a tractor 10 and a trailer 11, both of a well known form. The tractor is supported on a pair of front wheels 12 and rear driven wheels 13 and provides a cab 14 for a driver, not shown. The trailer has an elongated body 15 having a forward end pivotally supported on the tractor 10, as by a conventional fifth wheel, not shown, and a rear end supported on a pair of wheels 16. The tractor has a frame 17 and the trailer a frame 18 consisting of a pair of longitudinal beams 19 and a plurality of transverse beams 20, of any desired form, to which attention is drawn solely for the purpose of subsequently describing the mounting of elements of the subject invention thereon. It will be obvious that the motor carrier exemplifies operational environment for the subject invention to which the subsequently described structure is not intended to be limited.

It is the usual practice in such automotive carriers to provide an air pump 22 connected to an air reservoir 23 which is driven by the motor of the tractor, not shown, to provide an air pressure adequate for brake operation. A valve 24 is connected to the reservoir 23 and has an operating foot pedal 25 extended upwardly into the cab 14 for convenience of operation.

As exemplified in Fig. 5, each of the wheels is provided with a brake drum 28 containing brake shoes 29 which are expandable into drum engagement by a mechanism 30 of any suitable form within the drum. A rock shaft 31 is rotatably mounted in the frame 18 (or 17) adjacent to each of the brake drums 28 transversely of its respective frame. Inasmuch as the subject invention is not limited to any particular form of brake actuating mechanism 30 the interconnection thereof with the rock shaft is not shown in detail. It is sufficient to observe that rotatable positioning of the rock shaft serves to apply and to release the brakes by moving the shoes to and from drum engagement. The wheels of each pair on the tractor and trailer are mounted in alignment transversely of their respective vehicles, as is the custom, and the rock shaft of each wheel of each pair inwardly extended as shown in Fig. 5. The pairs of rock shafts are substantially aligned and usually provide spaced adjacent ends.

Brake operating levers 34 are radially extended rigidly from the rock shafts. Diaphragm housings 35 are mounted on the frames 17 and 18 adjacent to each of the levers 34. Each of the housings contains a diaphragm 36 to which a piston 37 is attached and extended toward the adjacent lever 34. Each of the pistons is pivotally connected to its respective lever 34. It will be noted that the diaphragm housings 35 provide a sleeve 38 slidably receiving their respective pistons 37. For reasons soon to become apparent, each piston consists of two portions endwardly abutted within its sleeve so that movement of the portion of the piston connected to the diaphragm toward its lever 34 urges the lever rearwardly and so that by emergency means soon to be described, the lever can be drawn away from the diaphragm housing without affecting the diaphragm position by the permissive spacing of the adjacent ends of the portions of the piston. Air lines 39 connect the diaphragm housing 35 and the valve 24 so that by foot pedal operation air is supplied under pressure to the housings with a resultant diaphragm movement transmitted through the pistons 37 to the rock shafts 31 to apply the brakes. When the foot pedal is released, the valve 24 releases the lines 39 to the atmosphere and the brakes are released. Except for the utilization of pistons having separable portions, the structures so far described are conventional and are referred to for descriptive convenience only.

As shown in Fig. 5, a pair of spaced bracket plates 40 are mounted on one of the transverse beams 20 adjacent to the rock shafts 31 and extended between the adjacent ends of the rock shafts. If no transverse beam 20 is conveniently adjacent to the rock shafts, it will be apparent that a bracket of any requisite form may be utilized to support the plates in the position shown or any other suitable position.

An L-shaped emergency lever 41 is pivotally mounted between the plate 40 as by a pin 42 and provides an upwardly extended end and a lower end forwardly extended between the operating levers 34. A rod 43 is mounted transversely in the lower end of the emergency lever 41 in a position engageable with the operating levers 34 upon clockwise pivotal movement of the emergency lever, as viewed in Fig. 3.

A helical tension spring 46 is connected to the upper end of the emergency lever 41 and to a transverse beam 20 forwardly thereof so as to urge the emergency lever in a clockwise direction as viewed in Fig. 3. The tension exerted by the spring may be adjusted by means of lock nuts 47 screw-threadably mounted on a portion of the spring in abutting relation to the transverse beam, as indicated. The spring is adjusted to a tension sufficient to rotate the lever 41 in the direction adapted to bring the rod 43 into engagement with the operating levers 34 and by such engagement to rotate the rock shafts 31 to apply the brakes with any desired predetermined force, preferably with such a force as is adequate to retard wheel rotation to a maximum without sliding tires mounted on the wheels.

Rearwardly of the emergency lever 41, a shaft 50 is journaled transversely in the frame 18 and a detent 51 radially extended therefrom. A latch arm 52 is pivotally mounted in the frame adjacent to the detent and provides a detent receptacle 53 adapted to receive the extended end of the detent. A chain 54 or other tension member is connected to the upper end of the emergency lever 41 and provides an elongated loop 55 in circumscribing relation to the detent. It will be noted in Figs. 3 and 5 that the detent is extended upwardly and appreciably away from the emergency lever 41 for receptacle engagement so that under the tensioning of the spring 46 the loop 55 is drawn downwardly on the detent to a position adjacent to the shaft 50 giving the end of the detent in latch engagement a substantial mechanical advantage over the turning moment imparted thereto by tensioning of the loop 55 against the detent under the urgency of the spring. Further, it will be noted that the receptacle and upper end of the detent are so complementarily shaped as to provide dependable hooked engagement and resistance to inadvertent disassociation by vibration or the like.

An electrical solenoid 58 is mounted in the frame 18 (or 17) and connected to the extended end of the latch 52 by a releasing arm 59. To further assure dependable detent 51 and receptacle 53 engagement, a spring 60 is preferably provided under initial compression between the solenoid and the latch. When the solenoid is energized, the arm 59 is drawn upwardly in opposition to the resistance of the spring 60 and the detent released from the latch subsequent to which the spring 46 pivots the detent forwardly, releases the loop 55 from the detent, and through engagement of the rod 43 with the operating levers 44 rotates the rock shafts to apply the brakes.

For purposes soon to become apparent, a normally open by-pass switch 63 is mounted on the sleeve 38 of each diaphragm housing 35, or other convenient position, and provided with an operating lever 64 extended from the housing longitudinally of the piston. A cam 65 is provided on the piston engageable with the extended end of the lever so that upon movement of the piston by the diaphragm 36 to the maximum extent of the travel of the diaphragm, the by-pass switch is closed.

A normally closed pressure responsive switch 68 is connected to the pneumatic service brake system between the valve 24 and the air reservoir 23. The switch is adapted to open in response to pressures in the reservoir adequate to operate the service braking system and automatically closes in response to decrease in the pressure to a level insufficient for operation of the service system. Motor carriers usually provide a battery 75 or other suitable source of electrical energy for operation of driving lights and the like and an ignition switch 76, exemplified in Fig. 2. In diesel operated carriers and the like having no ignition switch, a safety switch may be substituted if desired or omitted entirely. An emergency switch 80 individual to each of the solenoids 58 is preferably provided in a position of convenient access in the cab 14. Similarly, a multiple pole master emergency switch 81 is also provided in the cab. An electrical circuit shown in Fig. 2 is employed connecting the by-pass switch 63 and pressure responsive switch 68 electrically in parallel. Each of the solenoids 58 is connected in series with the parallel by-pass switch and pressure responsive switch, its respective emergency switch 80, the battery 75, and the ignition switch 76. It will be apparent that when either the pressure responsive switch 68 or the by-pass switch 63 is closed, closing of any emergency switch 80 will energize said switches' responsive solenoid 58. Inasmuch as it is seldom desired to operate the solenoids individually, the electrically parallel solenoids 58 are also connected in series with the master switch 81, battery 75, ignition switch 76, and parallel pressure responsive switch 68 and by-pass switch 63.

Operation

The operation of the emergency brake system of the present invention is believed to be clearly apparent and is briefly summarized at this point. During normal operation of the motor carrier, the conventional brake pedal 25 is employed to valve air under pressure to the diaphragm housings 35 to apply the brakes in the usual manner. Failure of such brakes due to a deficiency of air pressure in the reservoir 23, failure of the pneumatic operating system including the valve 24, diaphragms 36, pistons 37 and air lines 39 or excessive heating of the brake drums 28 causing their expansion to such an extent that maximum diaphragm actuation fails to expand the shoes 29 into drum engagement, however, does not deprive the operator of the tractor 10 of an ability to stop.

When there is an inadequate air pressure in the reservoir 23, the pressure responsive switch 68 automatically closes. If the ignition switch 76 is on, as during earth traversing movement of the tractor 10, closing of the master emergency switch 81 simultaneously energizes all of the solenoids 58 drawing the latches 52 from detent engagement and releasing the emergency levers 41 for operation of the brakes under the urgency of the springs 46.

In the event full actuation of the conventional service pneumatic brake system fails adequately to apply the brakes because of excessive brake drum expansion due to excessive heating, the full application of the service system serves to close the by-pass switch 63. In such condition, closing of the master emergency switch 81 simultaneously energizes the solenoids 58 to apply the brakes under the urging of the springs 46. Inasmuch as the pistons 37 are extensible because of their divisible portions, the rock shafts may be rotated beyond the limits achievable by full diaphragm operation so that the shoes 28 are brought into drum 28 engagement by the springs 46 even though the drums are excessively expanded.

Figure 4:
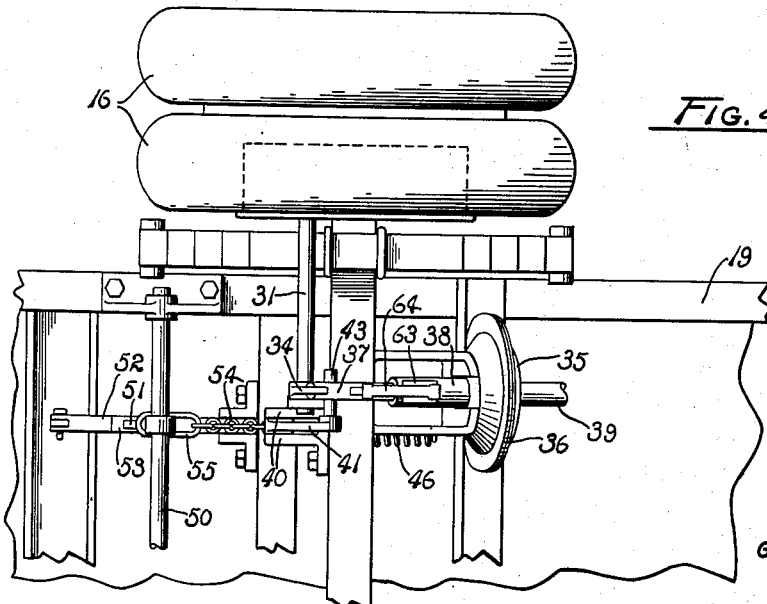
Fig. 4 is an enlarged, fragmentary, bottom plan view taken on line 4—4 of Fig. 1.

It is to be noted that the emergency system of the present invention is utilized only upon failure of the service system and that it is always conditioned for operation upon such failure. When the detents 51 are released from the latches 52 by energizing the solenoids 58, the brakes are continuously applied until each detent is reset in its respective latch. It is to be noted that even upon opening of any of the described switches the emergency system continues to apply the brakes until they are reset. The resetting is accomplished by first interrupting the electrical circuit shown in Fig. 2 by opening any of the switches. A portable windlass, or other suitable aid, not shown, is connected successively to the loops 55 and the emergency levers 41 drawn into cocked positions, as shown in Figs. 3, 4, and 5. The loops 55 are passed over the detents 51 and the detents located in the receptacles 53 of their respective latches 52. Latch and detent engagement is dependably maintained over the urging of the springs 60.

It will be apparent that inadvertent operation of the emergency system described would be extremely hazardous. Such inadvertent application is obviated by the electrical circuit described. The emergency system cannot be operated when the ignition switch 76 is "off." As long as there is adequate air pressure in the reservoir 23 to operate the service system, the emergency system will not function even upon closing of the emergency switch 80 or 81 except when the ignition switch 76 is "on" and unless the service system is fully operated so that the by-pass switch 63 is closed. If during operation of the motor carrier with the ignition switch "on" the air pressure decreases below that required for adequate service system operation, closing of the master switch 81 applies all of the brakes even without operation of the foot pedal 25.

Second form of emergency rock shaft operation

Commercial advantage is achieved in the subject invention by the production of the described emergency system in a form of universal application conducive to convenient mounting. An emergency rock shaft operating means is illustrated in Figs. 6, 7, and 8 conveniently suited to the purpose. In the modified form, a bifurcated emergency lever 90 is rotatably mounted on the rock shafts 31. The bifurcated portion of the lever provides a pair of aligned bearings 91 which are diametrically divided, the divided portions of the bearings being interconnected by headed bolts 92 extended through one portion of each bearing and screw-threadably engaged in its associated portion.

Shifting of the bifurcated emergency levers 90 axially of the shafts 31 is precluded by mounting an auxiliary lever 93 rigidly on the rock shaft 31 between the bearings 91. The auxiliary lever preferably provides a diametrically divided annular clamp, the portions of which are tightened into clamping engagement with the rock shaft 31 by a pair of headed bolts 94 passed through one of the portions and screw-threadably engaged in the opposite portion. When desired, further dependability in mounting of the auxiliary levers is assured by passing a bolt 95 diametrically through said levers and their respective rock shafts. The rigidly mounted auxiliary levers provide an extended leg 96 disposed for engagement with their respective emergency levers 90 upon rotation of said emergency levers theretoward.

A spring 97 is connected to the extended end of the emergency lever 90, as described for the spring 46 and emergency levers 41, and serves to draw the emergency lever 90 against its respective auxiliary lever through which the rock shaft on which they are mounted is rotated to apply the brakes. A tension member 98 similar to the chain 54 is utilized to retain the emergency lever in inoperable position and is releasably held by the releasable latch mechanism previously described.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an automotive vehicle having a plurality of wheels equipped with brakes each having individual control means adjacent thereto and a service brake operating system connected to the control means; an emergency system comprising levers pivotally mounted in the frame adapted individually to actuate the control means, said levers being pivotally movable between retracted and brake-actuating positions, springs connected to the levers urging the levers into actuating positions, latches releasably restraining the levers in retracted position, electro-magnetic means connected to the latches adapted to release the latches when energized, an electrical circuit including a source of electrical energy interconnecting the electro-magnetic means in parallel for concurrent actuation, a switch in the electrical circuit, and means for automatically detecting failure in the service brake operating system connected to the switch adapted to close said switch in response to such failure.

2. In a vehicle having a source of electrical energy, support wheels equipped with brakes, and a pneumatic brake operating system; an emergency brake operating system comprising electromagnetic means having controlled connection to the brakes operable to apply the brakes independent of the pneumatic system, a pressure responsive switch connected to the pneumatic system opened by pressures in the system above a predetermined level and closed in response to decrease of such pressures below the predetermined level, a manually operable emergency switch, and an electrical circuit connecting the electromagnetic means electrically in parallel and said parallel electromagnetic means in series with the pressure responsive switch, source of electrical energy, and emergency switch.

3. In an automotive vehicle having a plurality of support wheels equipped with brakes, and a fluid-operated service brake system; an emergency brake operating system comprising electromagnetic means having controlling connection to the brakes operable to apply the brakes independent of the service system, a source of electrical energy in the vehicle, a normally closed switch connected to the service system opened by pressures therein predetermined sufficient to operate the service system, a normally open by-pass switch having controlled connection to the service system closed by operation of said system to apply the brakes, a manually operable emergency switch, and an electrical circuit connecting the pressure responsive switch and the by-pass switch electrically in parallel, the electromagnetic means for the individual brakes electrically in parallel, and the parallel electro-magnetic means in series with the parallel pressure responsive switch and by-pass switch, source of electrical energy, and emergency switch.

4. In an automotive vehicle having a battery, a plurality of support wheels equipped with brakes, a source of pneumatic pressure, and a pneumatic brake operating system connected to the source of pneumatic pressure; an emergency brake operating system comprising standby means mounted in the vehicle adjacent to each of the brakes operable to apply the brakes independent of the pneumatic system, electromagnetic control means connected to the operating means, a normally closed pressure responsive switch connected to the source of pneumatic pressure opened by pressures therein predetermined sufficient to operate the pneumatic system, a normally open by-pass switch having controlled connection to the pneumatic system closed by operation of said system to apply the brakes, a manually operable emergency switch, and an electrical circuit connecting the pressure responsive switch and the by-pass switch electrically in parallel, the electro-magnetic control means electrically in parallel, and the parallel electro-magnetic means in series with the parallel pressure responsive switch and by-pass switch, battery, and emergency switch.

5. In an automotive vehicle having a plurality of wheels equipped with brakes each having a brake operating rock shaft rotatably mounted in the vehicle in controlling connection to its respective brake, the rock shafts having a service operating system connected thereto; an emergency system comprising levers rigidly mounted on the rock shafts and radially extended therefrom, said levers each having a predetermined reciprocal path of travel incident to rock shaft oscillation, means mounted in the vehicle for reciprocal movement between a position within the path of travel of the levers and a position retracted therefrom, said means being engageable with the levers to move the levers into brake applying position, latches releasably engaged with the movable means restraining said means in retracted position, springs connected to the movable means urging said means into the paths of travel of the levers to apply the brakes, and an emergency operating system connected to the latches operable concurrently to release the latches.

6. In an automotive vehicle having a plurality of wheels equipped with brakes, a rock shaft rotatably mounted in the vehicle adjacent to each of the brakes and having controlled connection to its respective brakes, a source of fluid under pressure, and a fluid-operated service brake control system connected to the rock shafts operable to rotate the shafts to brake-applying position; an emergency brake control system comprising means mounted in the vehicle adjacent to each of the rock shafts for movement between a retracted position and a predetermined brake-applying position, a lever rigidly mounted on each of the rock shafts engageable with the movable means during movement from retracted position to apply the brakes, latches releasably locking the movable means in retracted position, springs connected to the movable means urging said means into brake-applying position, electro-magnetic means connected to the latches adapted to release the latches upon energization, a source of electrical energy in the vehicle, a normally closed pressure responsive switch connected to the source of fluid under pressure held open by pressures in said system in excess of a predetermined level, a normally open by-pass switch responsive to the service control system closed upon operation of the system to apply the brakes, and an electrical circuit connecting the pressure responsive switch and the by-pass switch electrically in parallel, the electro-magnetic means in parallel, and said parallel electro-magnetic means in series with the parallel switches and source of electrical energy.

7. In an automotive vehicle having an ignition switch, a pair of wheels aligned transversely of the vehicle equipped with brakes, a rock shaft rotatably mounted in the vehicle adjacent to each of the brakes and having controlled connection to its respective brake, the rock shaft of the wheels of each pair being substantially aligned and having spaced adjacent ends, a source of pneumatic pressure, levers radially extended from the rock shafts, a diaphragm housing and piston connected to each of the levers, and a pneumatic system connected to the diaphragm housings and to a source of pneumatic pressure operable to apply the brakes; an emergency brake control system comprising an emergency lever pivotally mounted in the vehicle intermediate the adjacent ends of each pair of rock shafts, a rod mounted in the emergency lever and extended transversely of the rock shaft levers for engagement therewith, a spring connected to each of the emergency levers and urging said levers into positions drawing their respective rods against the rock shaft levers, releasable latches locking the emergency levers in positions with their respective rods withdrawn from rock shaft lever engagement, electro-magnetic means connected to the latches adapted to release the latches upon energization, a battery mounted in the vehicle, a pressure responsive switch connected to the source of pneumatic pressure opened by pressures therein predetermined sufficient to operate the pneumatic system and closed by pressures predetermined inadequate to operate said system, a by-pass switch closed by operation of a piston of a diaphragm housing to apply the brakes, an emergency switch, and an electrical circuit including the battery connecting the pressure responsive switch and the by-pass switch electrically in parallel, the electro-magnetic means in parallel, and said parallel electro-magnetic means in series with the parallel switches, the ignition switch, and the emergency switch.

8. In an automotive vehicle having support wheels equipped with brakes and rock shafts rotatably positioned to apply the brakes, bifurcated emergency levers rotatably mounted on the rock shafts and radially extended therefrom, levers rigidly mounted on the rock shafts intermediate the bifurcated portions of the emergency levers and engageable with their respective emergency levers in response to rotation of the emergency levers in predetermined direction on their respective shafts, springs interconnecting the emergency levers and the vehicle urging said emergency levers to engagement with their respective rigid levers, latch means releasably restraining the emergency levers from engagement with their respective rigid levers, and means operable concurrently to release the latch means.

GORDON B. TRIPP.

References Cited in the file of this patent

UNITED STATES PATENTS

| Number | Name | Date |
|---|---|---|
| 2,128,916 | Cox | Sept. 6, 1938 |
| 2,185,261 | Leupold | Jan. 2, 1940 |
| 2,192,021 | Weeks | Feb. 27, 1940 |
| 2,409,908 | Simpkins | Oct. 22, 1946 |